United States Patent
Harvey et al.

(10) Patent No.: US 7,810,137 B1
(45) Date of Patent: Oct. 5, 2010

(54) METHOD OF CONTROLLING NETWORK ACCESS THAT INDUCES CONSUMPTION OF MERCHANT GOODS OR SERVICES

(75) Inventors: Andrew G. Harvey, Pleasanton, CA (US); John Ng, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1182 days.

(21) Appl. No.: 10/744,183

(22) Filed: Dec. 22, 2003

(51) Int. Cl.
G06F 7/04 (2006.01)
G06F 15/16 (2006.01)
G06F 17/30 (2006.01)
H04L 29/06 (2006.01)

(52) U.S. Cl. .................. 726/4; 726/18; 726/21
(58) Field of Classification Search .......... 726/4
See application file for complete search history.

(56) References Cited

U.S. PATENT DOCUMENTS

| | | | | |
|---|---|---|---|---|
| 5,832,209 | A | * | 11/1998 | Krantz .................. 726/4 |
| 5,935,249 | A | * | 8/1999 | Stern et al. .................. 726/21 |
| 5,961,593 | A | * | 10/1999 | Gabber et al. .............. 709/219 |
| 6,016,484 | A | * | 1/2000 | Williams et al. .............. 705/39 |
| 6,044,466 | A | * | 3/2000 | Anand et al. .................. 726/1 |
| 6,154,839 | A | * | 11/2000 | Arrow et al. ................. 713/154 |
| 6,260,758 | B1 | | 7/2001 | Blumberg |
| 6,343,361 | B1 | * | 1/2002 | Nendell et al. .............. 713/171 |
| 6,393,484 | B1 | * | 5/2002 | Massarani .................. 709/227 |
| 6,463,474 | B1 | * | 10/2002 | Fuh et al. .................... 709/225 |
| 6,609,102 | B2 | | 8/2003 | Kolls |
| 6,668,321 | B2 | * | 12/2003 | Nendell et al. .............. 713/169 |
| 6,771,666 | B2 | * | 8/2004 | Barker, Jr. .................. 370/475 |
| 6,954,790 | B2 | * | 10/2005 | Forslow ...................... 709/227 |
| 7,032,241 | B1 | * | 4/2006 | Venkatachary et al. ......... 726/4 |
| 7,085,924 | B2 | * | 8/2006 | Bahl et al. .................. 713/156 |
| 7,100,195 | B1 | * | 8/2006 | Underwood .................. 726/2 |
| 7,130,454 | B1 | * | 10/2006 | Berube et al. ............... 382/118 |
| 7,224,699 | B2 | * | 5/2007 | Zhang ........................ 370/401 |
| 7,286,671 | B2 | * | 10/2007 | Yegin et al. ................. 380/270 |
| 7,540,013 | B2 | * | 5/2009 | Freund .......................... 726/1 |

(Continued)

OTHER PUBLICATIONS

Konrad, Rachel. "Hotel chain offers wireless Net access." CNET News.com http://news.com.com/Hotel+chain+offers+wireless+Net+access/2100-1033_3-270789.html. Jul. 30, 2001. pp. 1-2.*

(Continued)

*Primary Examiner*—Farid Homayounmehr
(74) *Attorney, Agent, or Firm*—Hickman Palermo Truong & Becker LLP

(57) ABSTRACT

A method of controlling access to a computer network, the method comprising the steps of receiving a request for network access from an end station device; receiving a unique identifier of the end station device; determining that the unique identifier is not within a set of authorized identifiers; assigning a short-term, non-routable network address to the end station device; receiving an authorization code from the end station device, wherein the authorization code has been previously issued in response to a purchase of goods or services from a merchant associated with the computer network; attempting to validate the authorization code; if the authorization code is validated, then assigning a longer-term, routable network address to the end station device.

26 Claims, 7 Drawing Sheets

U.S. PATENT DOCUMENTS

| | | | |
|---|---|---|---|
| 7,634,802 B2* | 12/2009 | Chiloyan | 726/4 |
| 2002/0062450 A1* | 5/2002 | Carlson et al. | 713/200 |
| 2002/0152325 A1* | 10/2002 | Elgebaly et al. | 709/246 |
| 2002/0178119 A1* | 11/2002 | Griffin et al. | 705/54 |
| 2003/0076837 A1* | 4/2003 | Whitehill et al. | 370/395.4 |
| 2003/0236847 A1* | 12/2003 | Benowitz et al. | 709/206 |
| 2004/0111640 A1* | 6/2004 | Baum | 713/201 |
| 2004/0125781 A1* | 7/2004 | Walter et al. | 370/338 |
| 2004/0250129 A1* | 12/2004 | Clough et al. | 713/201 |
| 2005/0097046 A1* | 5/2005 | Singfield | 705/42 |
| 2007/0078999 A1* | 4/2007 | Corson et al. | 709/230 |
| 2007/0268908 A1* | 11/2007 | Linkola et al. | 370/395.2 |
| 2007/0277229 A1* | 11/2007 | Vogel et al. | 726/4 |
| 2009/0083861 A1* | 3/2009 | Jones | 726/29 |

OTHER PUBLICATIONS

Sidline, John. "High-Speed Wireless Internet Access Now Available at Minneapolis-St. Paul International Airport." iPass Press Release Archive. http://www.ipass.com/pressroom/pressroom_releasearchive.html?rid=18. Mar. 20, 2002. pp. 1-2.*

Nobel, Carmen. "WiFries: McDonald's Adds WLAN Access to Its Menu." Wireless. http://findarticles.com/p/articles/mi_zd4168/is_200303/ai_n9516134. Mar. 2003. pp. 1-3.*

Mobile, Wireless, and Pervasive Computing, Chapter 6. http://media.wiley.com/product_data/excerpt/09/04713478/0471347809.pdf. pp. 173-175.*

Wireless Advisor, "McDonalds Serves Up McWi-Fi",2004, hpttp://wirelessadvisor.net/doc/12104, page generated on Oct. 15, 2004,retrieved on Oct. 15, 2004, pp. 1-4.

* cited by examiner

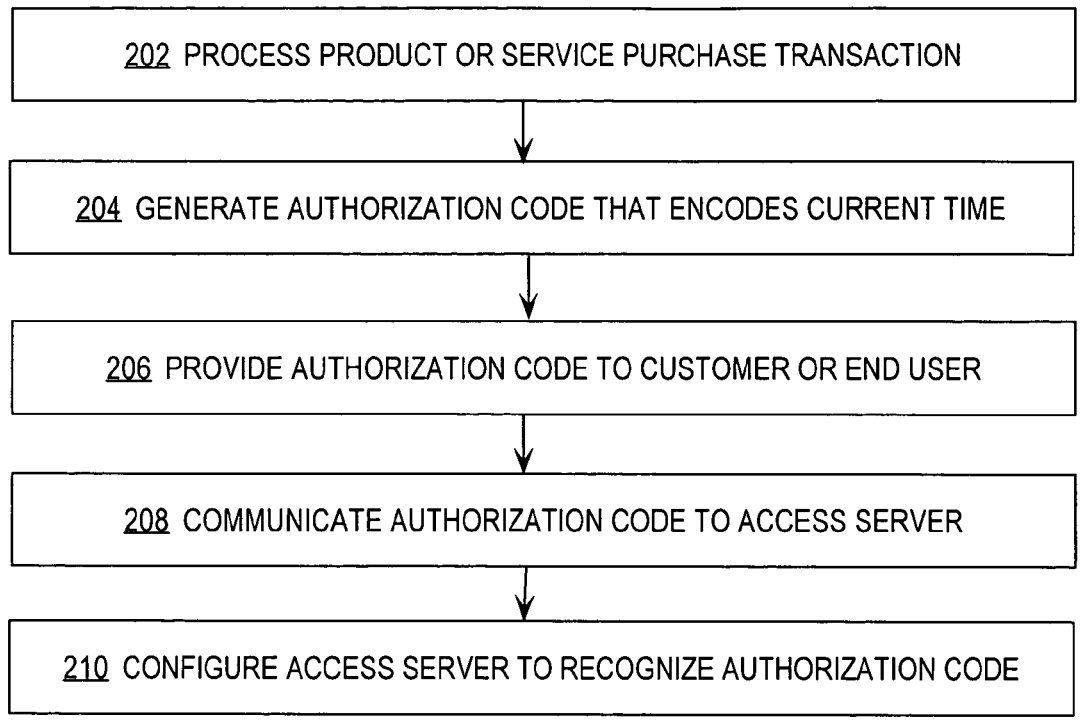

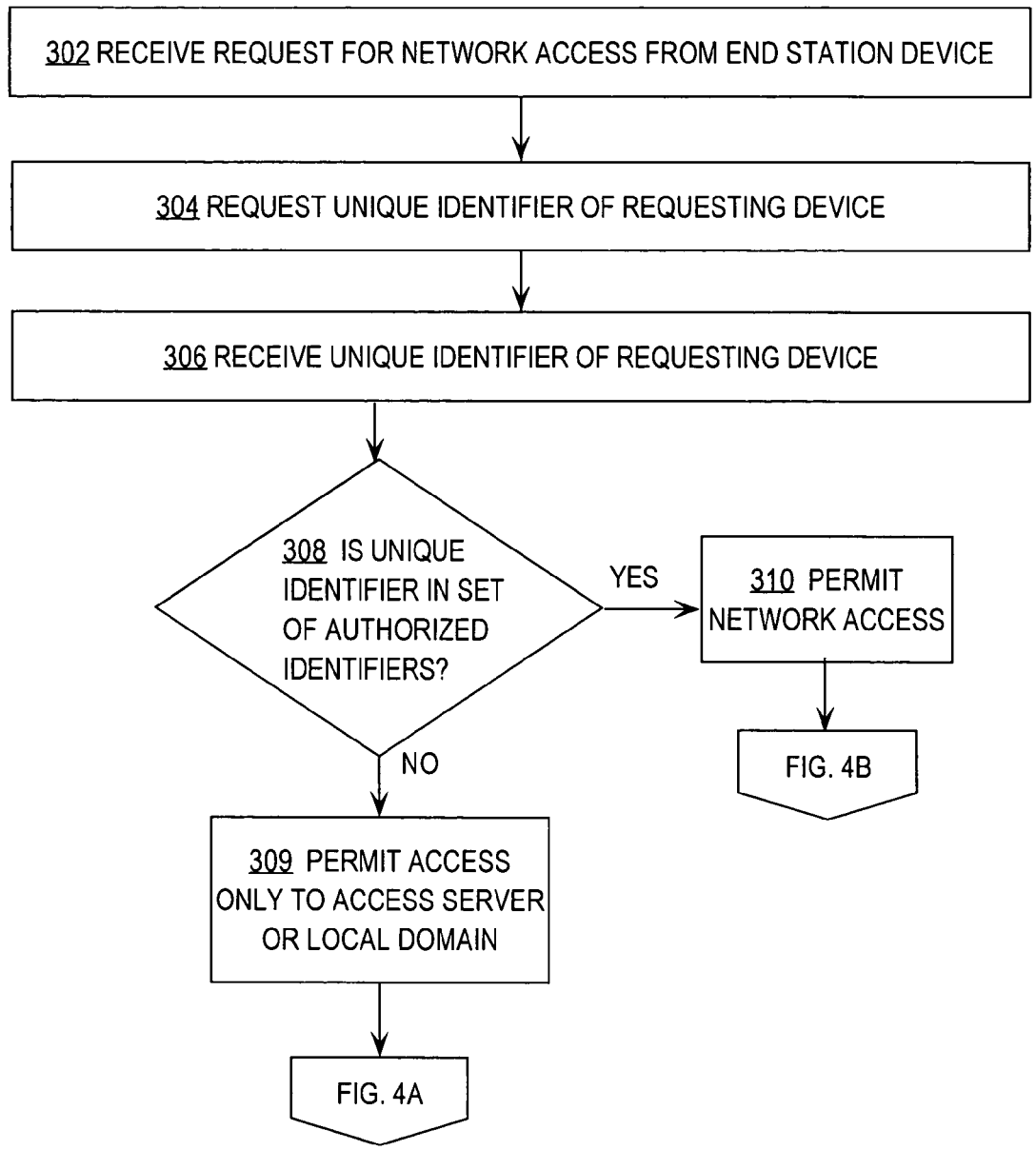

METHOD OF CONTROLLING NETWORK ACCESS THAT INDUCES CONSUMPTION OF MERCHANT GOODS OR SERVICES

FIELD OF THE INVENTION

The present invention generally relates to controlling access to a network. The invention relates more specifically to a method of controlling network access that induces consumption of merchant goods or services.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Public wireless broadband network access is becoming widely available at retail merchants such as coffeehouses, restaurants, and bookstores, among others. In some cases such merchants provide network access in conjunction with the purchase of a product. Thus, these merchants find that providing network access serves as an incentive to customers to patronize such merchants rather than other merchants who do not provide network access. Merchants who provide network access also find that providing network access serves as an incentive to customers to purchase the merchant's goods and services.

However, these merchants generally earn profits from selling conventional goods and services, not from selling network access. If a customer purchases one cup of coffee for a nominal amount and then occupies a table for several hours while using the internet, the merchant suffers by having one customer occupy the table for too long, depriving other 50325-0853 (Seq. No. 7840) customers of space in the establishment and the incentive to purchase goods or services. The merchant also suffers by granting network access having a value far greater than the product that was purchased. Thus, there is a need for merchants to have a way to control network access to prevent abuse by such customers.

Such merchants also typically employ individuals who are skilled at customer service and the merchant's particular products and services, but not skilled in computers, network access, computer configuration, and related technical issues. Therefore, there is also a need to have a very simple access control mechanism, so that the merchant's retail sales employees are not required to help customer solve network access problems.

The use of technically "heavyweight" security solutions such as LEAP, for authenticating wireless devices that are allowed to use LANs hosted by a merchant, is known in this context.

Other such systems require the system to have personal knowledge of the customer who is being provided network access or through receiving personal information (e.g., credit card number) or through establishing a pre-existing account with a particular service provider. This option is generally not acceptable for customers who travel frequently, and merely need to send or receive email. Similarly, this option is unattractive for customers who prefer to keep their personal information confidential irrespective of the number of visits to a particular franchise.

Merchants are often wary of situations in which they do not have control over the equipment that is installed at a merchant location. This can happen, for instance, when a service provider provides network access equipment at a merchant location, but the equipment is owned and maintained by the service provider. As a result, the merchant does not have control over the network services provided by that equipment, and this can cause problems under certain circumstances. For example, the merchant may wish to provide free network access time to a valued customer, or if the customer lost network access time due to circumstances outside the control of the customer. If the equipment is owned by a third party service provider, then the merchant may be unable to provide special services to its customers in these cases. In addition, the merchant is typically required to sign a contract with the service provider, preventing the merchant from removing the equipment prior to a specific date even when adverse circumstances occur, such as abuse of network access privileges by customers).

Cisco Systems, Inc. of San Jose, Calif. has previously developed certain solutions for prepaid access to mobile wireless services. In these solutions a customer uses a credit card account or debit card account to prepay for services such as games, email, etc. that are accessed through a mobile phone. Payment is provided by making a separate secure Web connection, selecting from a menu, and providing a credit card account number. However, these solutions are not well integrated into the retail merchant sales process.

Frequent buyer cards and other merchant loyalty programs, not related to network access or computer use, are also known.

Further, in certain approaches, scratch cards containing authorization codes are used. However, many small businesses cannot absorb the costs of printing or using scratch cards.

In view of the above, there is a need for a way to control network access provided to customers that enables merchants to better control the network access that is provided.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram of a process of generating an authorization code;

FIG. 3 is a flow diagram of a process of controlling network access;

DETAILED DESCRIPTION OF THE PREFERRED EMBODIMENT

Figure 1:
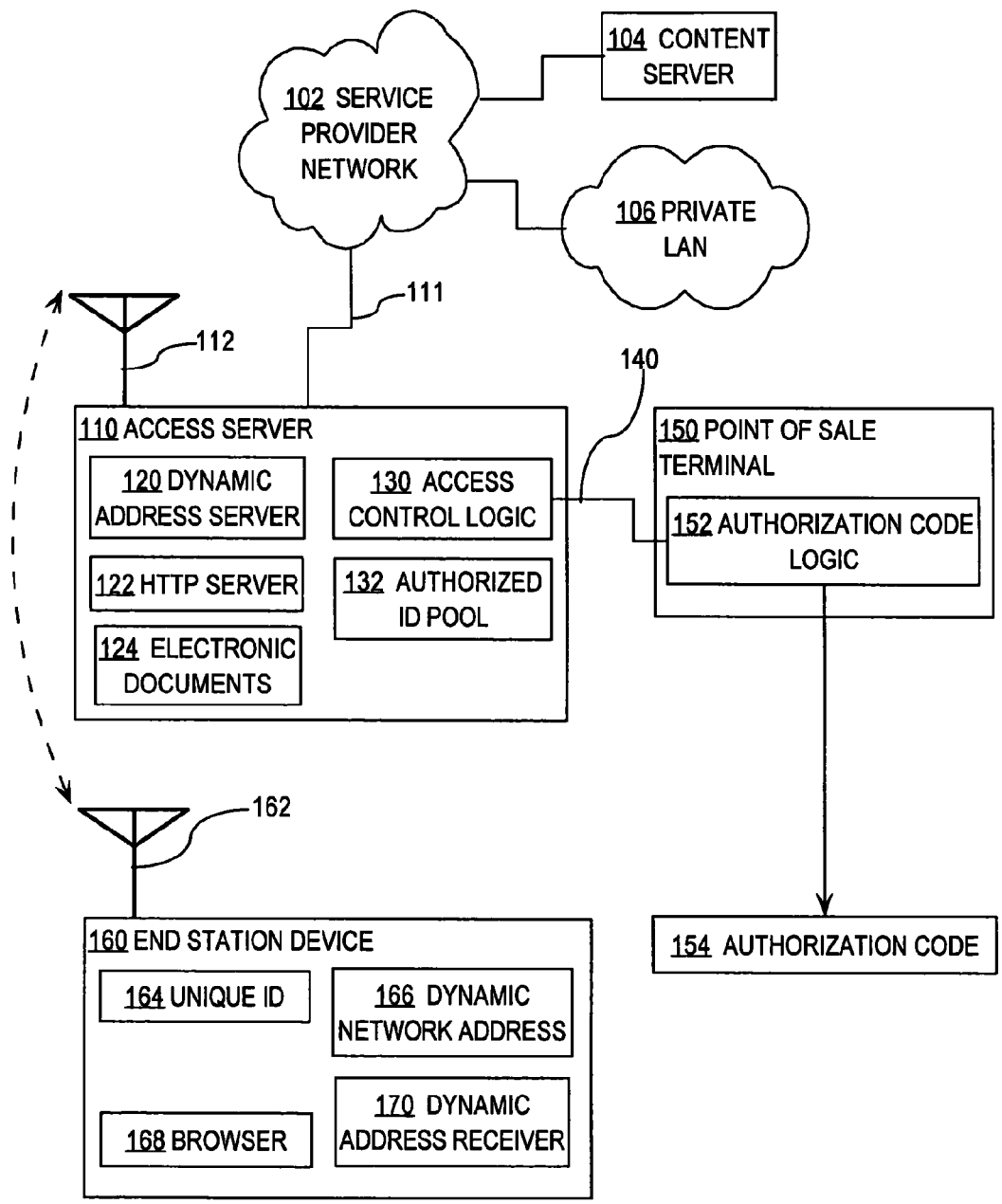
FIG. 1 is a block diagram of a network access system.

A method and apparatus for determining network routing information based on shared risk link group information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| | 2.1 Example Network Access System |
| | 2.2 Generating Authorization Codes |
| | 2.3 Processing Requests for Network Access |
| 3.0 | Implementation Mechanisms-Hardware Overview |
| 4.0 | Extensions and Alternatives |
| | *** |

1.0 General Overview

The needs identified in the foregoing Background, and other needs and objects that will become apparent for the following description, are achieved in the present invention, which comprises, in one aspect, a method of controlling access to a computer network, the method comprising the steps of receiving a request for network access from an end station device; receiving a unique identifier of the end station device; determining that the unique identifier is not within a set of authorized identifiers; assigning a short-term, non-routable network address to the end station device; receiving an authorization code from the end station device, wherein the authorization code has been previously issued in response to a purchase of goods or services from a merchant associated with the computer network; attempting to validate the authorization code; if the authorization code is validated, then assigning a longer-term, routable network address to the end station device.

In other aspects, the invention encompasses a computer apparatus and a computer-readable medium configured to carry out the foregoing steps.

Stated generally, in one embodiment network access is granted only in response to providing a valid access code that is obtainable only by purchasing a product or service, and then only for a specified time period.

In one embodiment, the approaches herein are implemented in a single network device. As a result, a small business owner with little funds can purchase equipment to implement the approaches herein. In addition, the amount of management and maintenance required for such an integrated system is minimal. Moreover, since it is unnecessary to connect multiple devices, such an implementation provides ease of use not present in more complex systems. As a result, through a minimal investment cost, the approaches described herein afford the merchant flexibility not present with the standard contract that is signed with the service provider, both with respect to the use and maintenance of the equipment, as well as in the policies that are applied in the establishment of pricing and promotions that are implemented.

According to one approach, a merchant can control network access of a customer at a merchant location while giving the merchant control over pricing, promotions and upgrades in a manner that is easy to manage and maintain. In one embodiment this is accomplished, in part, through providing network access information such as a network access code to a customer in response to payment for goods or services. Through the use of the network access code, the customer may gain access to the Internet at a merchant location associated with the merchant.

2.0 Structural and Functional Overview 2.1 Example Network Access System

FIG. 1 is a block diagram of a network access system that may be used in an example embodiment of the invention. As an overview, FIG. 1 depicts an end station device 160 that establishes wireless communication with an access server 110, through use of an authorization code 154 generated by a point of sale ("POS") terminal 150. The access server 110 is communicatively coupled to the POS terminal 150 by link 140. The end station device 160 can access network 102 and resources associated with it only by establishing authorized communication with the access server 110, which thereby controls access to the network.

The service provider network 102 is communicatively coupled to, or includes, a content server 104 and a private local area network (LAN) 106. For example, service provider network 102 is an asynchronous digital subscriber line (ADSL) network, cable network, dial-up network, or other form of network. Content server 104 holds content or a service that an end user or end station uses, as described further below. Private LAN 106 may be, for example, a private corporate network that is remotely accessed by an employee or other authorized user, using the techniques described further herein.

An embodiment need not have both content server 104 and private LAN 106. The content server 104 and private LAN 106 are illustrated as examples of resources that could be accessed through the techniques described herein.

An access server 110 is communicatively coupled to network 102 through a link 111, which in various embodiments may comprise an ADSL line, cable connection, dial-up connection, satellite link, ATM or frame relay link, etc. Access server 110 comprises an antenna 112 and an associated wireless network communication interface, dynamic network address server 120, hypertext transfer protocol (HTTP) server 122, electronic documents 124, and access control logic 130, the functions of which are described in detail in other sections herein. Access server 110 may include a firewall or other elements for screening traffic directed to the access server by end station 160 or other end stations. Access server 110 acts as an access control point with respect to attempts by end station 160 or other end stations to access the network 102; such end stations cannot access network 102 unless granted access by the access server.

In general, antenna 112 and the associated wireless network communication interface enable access server 110 to act as a wireless network access point (AP) for a plurality of separate end station devices that communicate wirelessly with the access server. In one embodiment, dynamic address server 120 is a dynamic host control protocol (DHCP) server. The dynamic address server 120 selectively issues dynamic network addresses, such as IP addresses, to end station devices that request access to network 102. HTTP server 122 processes requests from the end station devices and generates replies in the form of electronic documents 124 to facilitate communication with requesting end stations. Access control logic 130 represents one or more elements of software, hardware, firmware, or a combination thereof that implement the functions described further herein.

For purposes of illustrating a clear example, dynamic address server 120, HTTP server 122, electronic documents 124 and access control logic 130 are depicted in FIG. 1 as within or integrated into the access server 110. However, one or more of these elements may be implemented as a physically separate device or process that is accessible to the access server 110 through the LAN to which the access server is connected.

Point of sale terminal 150 comprises authorization code logic 152 that can generate one or more authorization codes 154. In one embodiment, point of sale terminal 150 is owned or operated by a retail merchant that sells one or more goods or services in exchange for money or other value. An authorization code 154 is issued appurtenant to a sales transaction, either with or without a separate charge for access to the network 102.

Link 140 may comprise a connection through a local area network (LAN) that includes access server 110 and POS terminal 150, and that is locally associated with a merchant that owns and operates POS terminal 150 as part of the merchant's business. Thus, POS terminal 150 may communicate authorization codes and configuration commands to access server 110 through link 140 using conventional LAN protocols. When end station 160 is communicating wirelessly to access server 110 through antennas 162, 112, then the end station may be considered within the same merchant LAN that includes POS terminal 150 and the access server.

End station device 160 comprises an antenna 162 and an associated wireless communications interface, unique identifier 164, dynamic address 166, browser 168 and dynamic address receiver 170, the functions of which are described in detail in other sections herein.

In general, antenna 162 and the associated wireless network communication interface enable end station device 160 to act as a wireless client with respect to access server 110. The dynamic address receiver 170 interacts with dynamic address server 120 of access server 110 to request and receive dynamic network address 166 for use by end station device 160 to identify itself and for use by network 102 to route information to the end station device. In one embodiment, dynamic address receiver 170 is a DHCP client, and dynamic network address 166 is a dynamically assigned IP address. Browser 168 acts as a client of HTTP server 122 of access server 110, and issues requests from the end station devices and displays replies from the access server in the form of electronic documents 124 to facilitate communication with requesting end stations. No special access control logic is needed at end station 160, which can interact with access server 110 entirely using an open standard protocol, such as HTTP.

Although the use of IP, HTTP, and DHCP are described herein with respect to certain embodiments, such protocols are provided simply as examples, and any other protocols that perform equivalent functions, whether now known or invented hereafter, may be used in other embodiments.

Figure 4A:
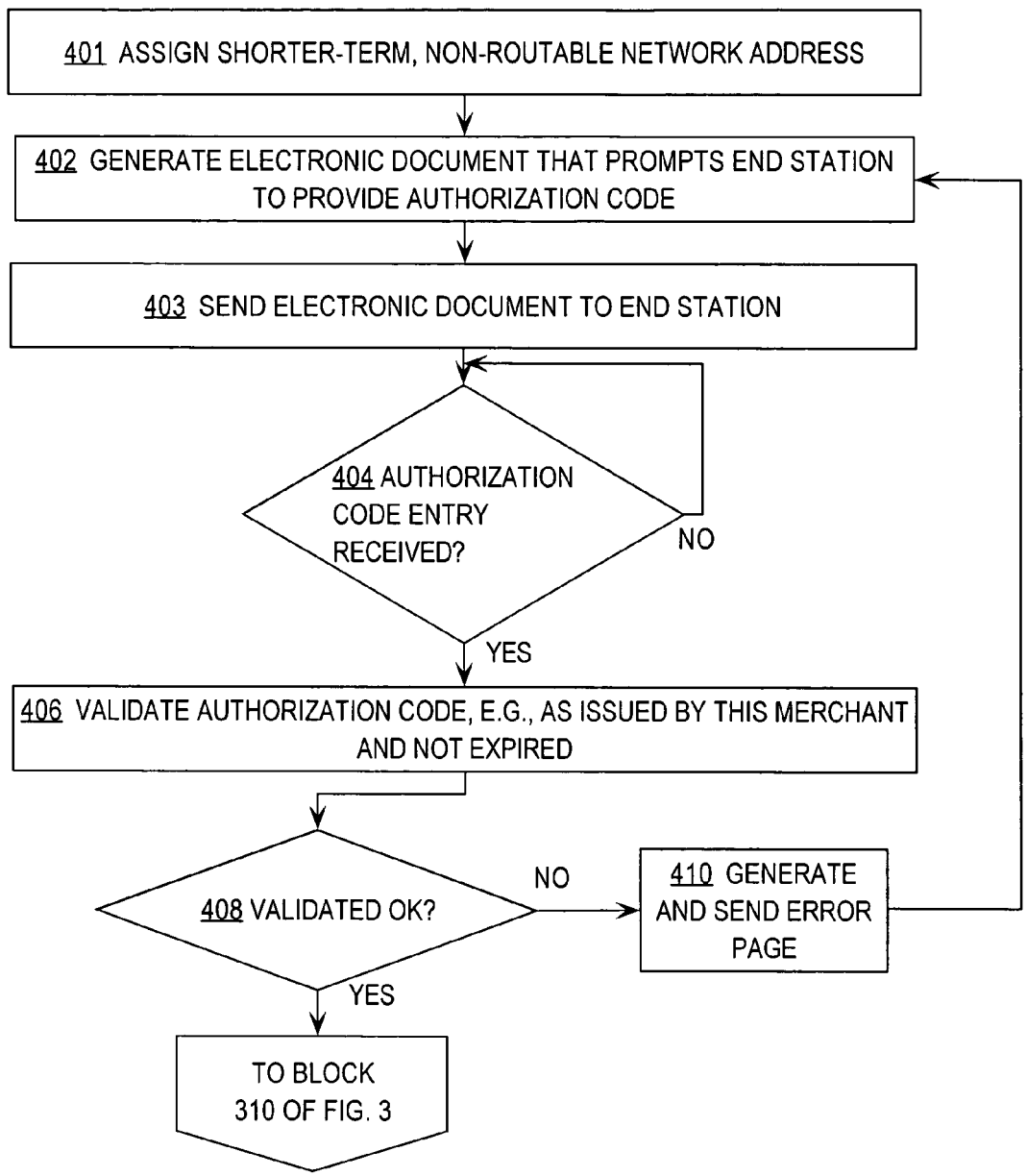
FIG. 4A and FIG. 4B are flow diagrams of additional steps in the process of FIG. 3, relating to granting and denying network access, respectively.
Figure 4B:
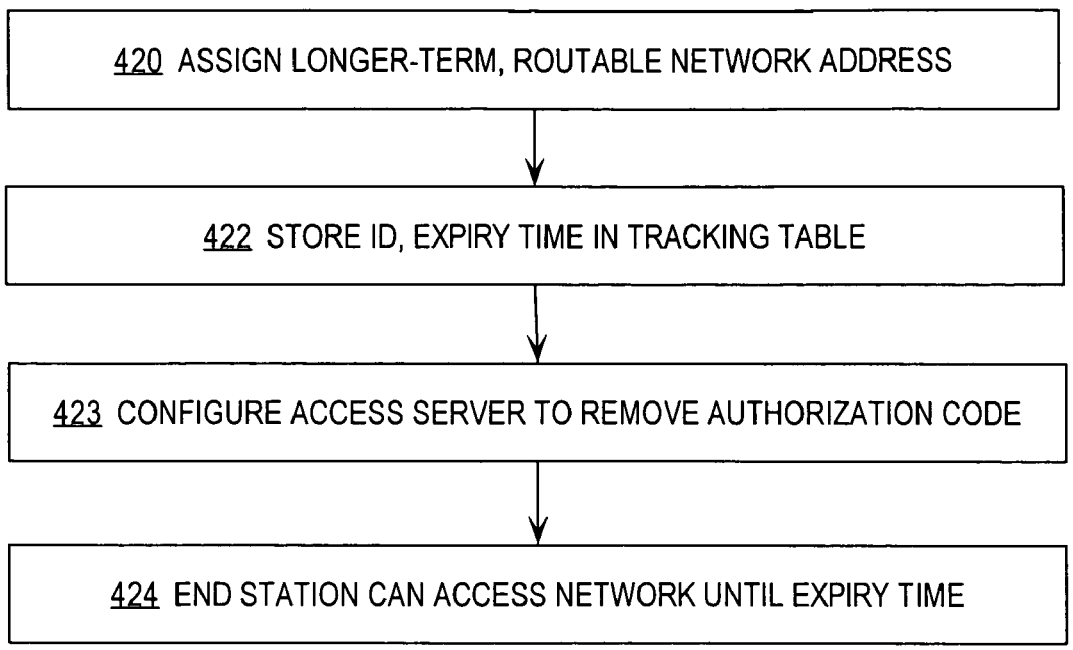
Figure 5:
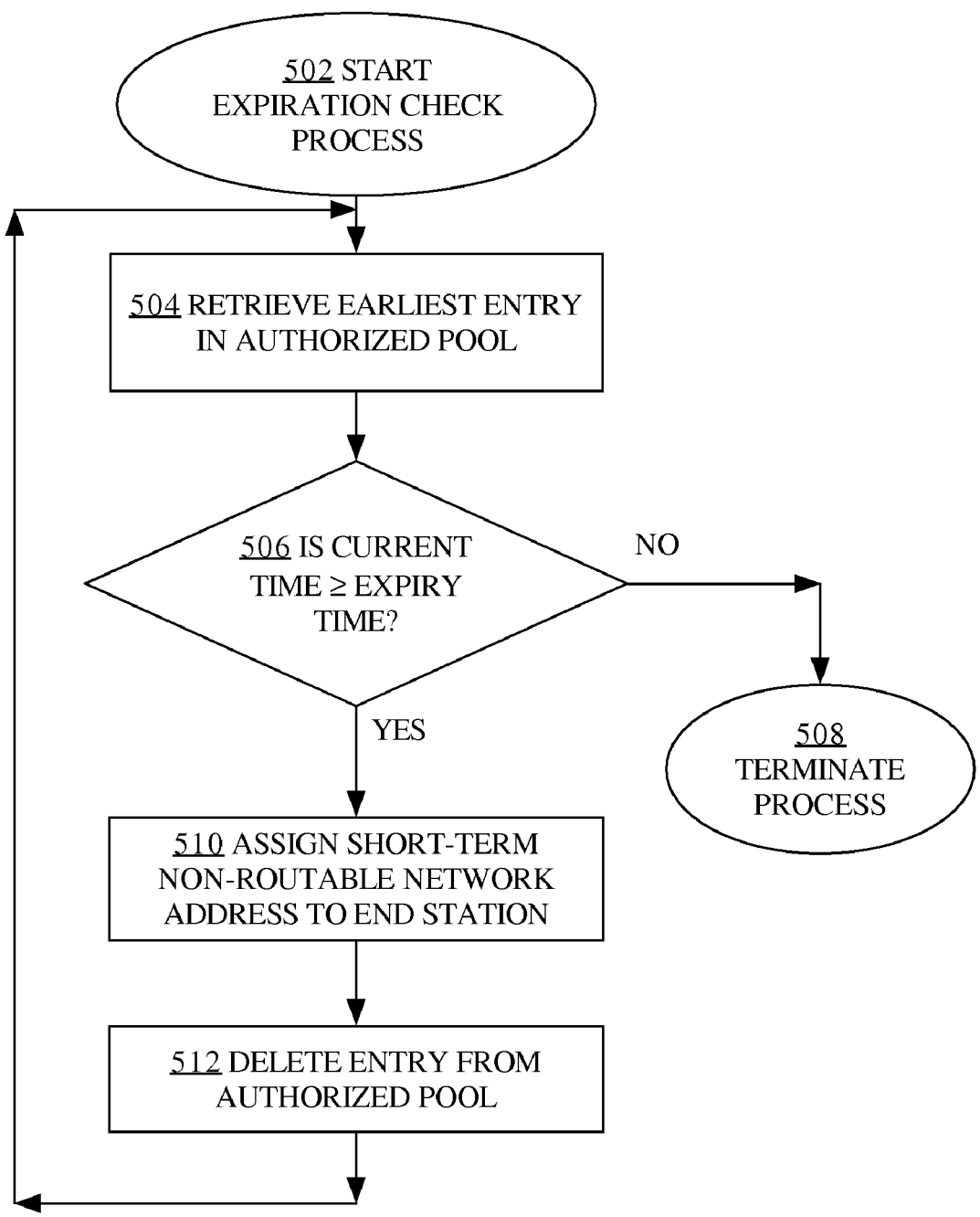
FIG. 5 is a flow diagram of a process of removing network access.

FIG. 2 is a flow diagram of a process of generating an authorization code. FIG. 3 is a flow diagram of a process of controlling network access. FIG. 4A and FIG. 4B are flow diagrams of additional steps in the process of FIG. 3, relating to granting and denying network access, respectively. FIG. 5 is a flow diagram of a process of removing network access. For purposes of illustrating a clear example, FIG. 2, FIG. 3, FIG. 4A, FIG. 4B, and FIG. 5 are described herein with reference to the example system of FIG. 1. However, the processes and functions illustrated in FIG. 2, FIG. 3, FIG. 4A, FIG. 4B, and FIG. 5 may be used in systems having a different arrangement.

2.2 Generating an Authorization Code

Referring first to FIG. 2, in block 202, a transaction for a purchase of a product or service is processed. For example, when an embodiment is implemented in the context of a retail establishment, a retail merchant or its employee sells a product or service to a customer. Typically such a sales transaction involves using an electronic cash register or other point-of-sale terminal to enter information about the goods or services that are purchased, compute a price, enter an amount of value that is provided by the customer in bank notes or through a credit card, and process the transfer of value. In block 204, an authorization code that encodes the then-current time is generated, and the authorization code is provided to the customer in block 206.

Continuing with the example, in one embodiment the POS terminal generates an authorization code in coincidence with processing the sales transaction. For example, under control of appropriate logic the POS terminal generates a printed receipt that contains an authorization code. In one embodiment, the authorization code encodes the then-current date and time so that the access point later can determine when the amount of allowed network access time has expired. In such an embodiment, the amount of allowed time may be fixed in an appropriate interval, e.g., 30 minutes. Optionally, the amount of allowed time is also encoded in the authorization code.

Any suitable technique for generating the authorization code may be used provided the authorization code is not easily guessed or determined by an end user. For example, the authorization code may be a sequence number. Alternatively, a one-way hash function is applied to numeric values representing the then-current date, time, and allowed access time, and the resulting hashed value is obfuscated among an equal number of pseudo-random filler characters. In certain embodiments, the authorization code functions as a one-time username and password combination, as further described below.

In block 208, the authorization code is communicated to an access server that controls access to the network. In block 210, the access server is configured to recognize the authorization code. In one example embodiment, block 208 involves POS terminal 150 forming a configuration command that causes access server 110 to recognize the authorization code that was generated in block 204. The configuration command is formed according to a command syntax that is compatible with access server 110. When executed or processed by access server 110, the configuration command causes the access server to accept a login by a user or end station that presents the authorization code.

For example, assume that in block 204 the POS terminal 150 generates an authorization code of "123456" using a sequence number approach. Assume further that access server 110 is a wireless access point (WAP) of the type made by Cisco Systems, Inc. and compatible with the Cisco command-line interface (CLI) command and configuration language. In block 208, POS terminal 150 forms the CLI command "username 123456 password 123456". In block 210, POS terminal 150 sends the CLI command to access server 110 over link 140. In response, access server 110 processes the CLI command and configures itself to recognize "123456" as a valid username and password.

An end user now holds an authorization code that is valid for a specified period of network access, and the access server has been configured to recognize the code. The end user may proceed to use the authorization code to gain access to the network, as now described with reference to FIG. 3.

2.3 Processing Requests for Network Access

In FIG. 3, at block 302, a request for network access is received from an end station device. In the context of FIG. 1, block 302 may comprise access server 110 receiving wireless packets from end station device 160 that represent a DHCP request for an IP address, a URL or other request by the end station device for internet access.

In block 304, a request for a unique identifier of the requesting device is issued. While the request of block 302 may include a static or initial source network address (e.g., an IP address) of end station device 160, typically in the Source IP Address field of IP packets, the request does not necessarily uniquely identify the end station device 160. In particular, in IP implementations in which private addresses are used to identify end station devices, multiple different end station devices associated with different enterprises or other owners may use the same private IP address. Further, source IP addresses in packets are relatively easy to forge or spoof and therefore one end station device 160 lacking authorized network access could potentially masquerade as an authorized end station device.

Accordingly, in one embodiment block 304 involves requesting end station device 160 to provide a unique identifier for itself. Typically block 304 is performed using a wire line protocol that is not exposed in the user interface of the end station, so that a user of end station 160, for example, is unaware that block 304 is performed. In one approach block 304 may involve requesting a Media Access Control (MAC) address, which is typically persistently stored in the end station device 160 by its manufacturer and not easily forged or changed by the end user.

In block 306 the requested unique identifier is received. For example, the end station device 160 sends its MAC address to access server 110.

In block 308, a test is performed to determine whether the received unique identifier is within a set of authorized identifiers. In one embodiment, as shown in FIG. 1, access server 110 maintains an authorized identifier pool 132 that contains identifiers, such as MAC addresses, of all end stations that are then currently authorized to have network access. In another embodiment the authorized identifier pool 132 may be organized as a table that maintains, for each authorized end station, its MAC address and expiry time after which network access is not authorized. In any of these embodiments, block 308 involves determining whether the unique identifier just received from the end station is within the authorized identifier pool 132.

If the unique identifier of the end station is in the set of authorized identifiers, then the end station is permitted network access, as shown in block 310 and as further shown in FIG. 4B. If the unique identifier of the end station is not in the set of authorized identifiers, then the end station is permitted to access only the local access point, e.g., access server 110, as further shown in FIG. 4A.

Referring now to FIG. 4A, in block 401, a local network address is assigned to the end station. In one embodiment implemented in the context of FIG. 1, block 401 involves access server 110 requesting dynamic address server 120 to issue a short-term lease of a local, non-routable network address to the end station 160. The DHCP protocol may be used to issue a short-term lease of a local, non-routable IP address, which is stored as dynamic address 166 of end station device 160. As a result, end station 160 can contact access server 110, receive electronic documents such as HTML pages from the access server, and issue requests to the access server. However, requests from the end station 160 are not routable by the access server 110 into the network 102.

In block 402, an electronic document is generated that prompts the end station to provide the authorization code. For example, access server 110 retrieves one of the electronic documents 124, or dynamically generates an electronic document, containing a prompt to enter an authorization code. In one embodiment, the electronic document prompts the user to enter a conventional username and password; the user may provide the previously generated authorization code as both the username and password. This alternative is appropriate where, for example, the access server 110 has been configured with the authorization code as a username and password, as described above in connection with FIG. 2, block 208, and block 210.

In block 403, the electronic document also is sent to the end station. It is presumed that the end station displays the electronic document. The electronic document may be an HTML document that is displayed using a browser at the end station. Alternatively, any other form of electronic document and client display mechanism may be used. For example, the document may be an XML document that is parsed and displayed by an XML parser cooperating with a browser. The document may be a set of messages that cause the operating system of the end station to display a pop-up prompt window or dialog box using native operating system graphical user interface capabilities.

In block 404, a test is performed to determine whether an authorization code entry has been received. If not, control returns to block 404 to await entry of the code. If an authorization code is entered, then in block 406 the authorization code is validated. In this context, validating the authorization code comprises one or more steps of decoding and testing the authorization code to determine that the authorization code was issued by the merchant that owns or operates the process, and that the authorization code is not expired.

If the authorization code is properly validated, as tested in block 408, then control proceeds to block 310 of FIG. 3, in which network access is provided. If the authorization code is not validated, then in block 410, an electronic document reflecting failed authorization ("error page") is retrieved and sent, or dynamically generated and sent. The error page may include a renewed prompt to enter a valid authorization code, as indicated by the arrow directed to block 402. In another embodiment, the number of access attempts by each end station is tracked, and if a specified maximum number of access attempts is exceeded, then the end station is blocked from performing further access attempts for a specified period of time.

Referring now to FIG. 4B, in block 420 a long-term, routable network address is issued. For example, dynamic address server 120 of access server 110 issues a long-term lease of a routable network address to end station 160. DHCP may be used to issue a long-term lease of a routable IP address to end station 160, thereby enabling end station 160 to issue requests that are routable into network 102 and can be received and replied to by content server 104 or elements of LAN 106.

In block 422, a record identifying the end station is stored in a tracking table. For example, a record specifying the MAC address of end station 160 and an expiry time value is stored in an entry in the authorized identifier pool 132. As a result, end station 160 becomes authorized to access the network 102 for a period of time until the expiry time value arrives, as indicated by block 424.

Optionally, as indicated in block 423, the access server is re-configured to remove the authorization code. For example, in an implementation in which block 208, block 210 of FIG. 2 involved configuring the access server with username and password values corresponding to the authorization code, in block 423 the username and password values are removed from the access server by creating and sending an appropriate deletion command. As a result, positive action is taken at the access server to prevent the user from logging in again. This provides additional protection against access to the network 102 beyond the expiry time value.

Certain implementations of DHCP servers include persistent storage of lease information and are capable of computing the remaining validity times for particular leases. If such a DHCP server is used, either as an integrated part of access server 110 or otherwise in association with a system such as that of FIG. 1, then the DHCP server may compute a remaining time for a particular client lease and take appropriate action to delete a corresponding username and password from the access server when the lease expires.

FIG. 5 is a flow diagram of a process of removing network access. In general, periodically, access server 110 scans the authorized identifier pool 132 and compares the then-current time to each expiry time value. If the then-current time is equal to or greater to the earliest expiry time value, then the associated end station is removed from network access. For the purpose of facilitating such scanning, the authorized identifier pool 132 may be maintained in sorted order.

Referring now to FIG. 5, in block 502, the expiration check process represented by the remainder of FIG. 5 is started. In various embodiments block 502 may represent maintaining a timer of a suitable interval and spawning a new thread or process that implements the remainder of FIG. 5. For example, the process of FIG. 5 could be initiated every minute according to a timer running in another process or thread.

In block 504, the earliest-dated entry in the authorized pool is retrieved. If the authorized pool is maintained in sorted order then the topmost entry may be retrieved.

In block 506, the process tests whether the then-current real time is greater than or equal to the expiry time. If not, then in block 508 the process is terminated because no authorized end station has reached the end of its authorized network access time. If the test of block 506 is true, then the end station represented in the earliest-dated entry of the authorized pool has reached the end of its authorized network access time. Therefore, in block 510 a short-term, non-routable network address is dynamically assigned to the end station. For example, access server 110 uses dynamic address server 120 to generate a short-term lease of a local, non-routable dynamic IP address to end station 160. Further, in block 512, the entry is deleted from the authorized pool.

In effect, the actions of block 510 and block 512 cuts the end station 160 off from network access because IP packets issued by the end station are no longer routable in the network. Further, the MAC address or other unique identifier of the end station 160 is no longer in the authorized pool. As a result, any subsequent request or packet from the end station will fail the test of block 308 of FIG. 3. Network access is accordingly refused, and the end user is prompted to enter an authorization code as described above with respect to FIG. 3. Further, the authorization code previously used by the end user will have become expired; therefore, if the end user attempts to re-use the authorization code, the test of block 408 of FIG. 4A will fail. Accordingly, to gain further network access the end user is required to purchase another product or service from the merchant and obtain a new authorization code with a later expiration date.

Using the disclosed approaches, merchants can offer network access as an incentive for the purchase of products or services, without having customers use too much network service in comparison to the value of their purchases. The availability of wireless network services, in particular, provides a customer incentive to purchase products or services.

3.0 Implementation Mechanisms—Hardware Overview

Figure 6:
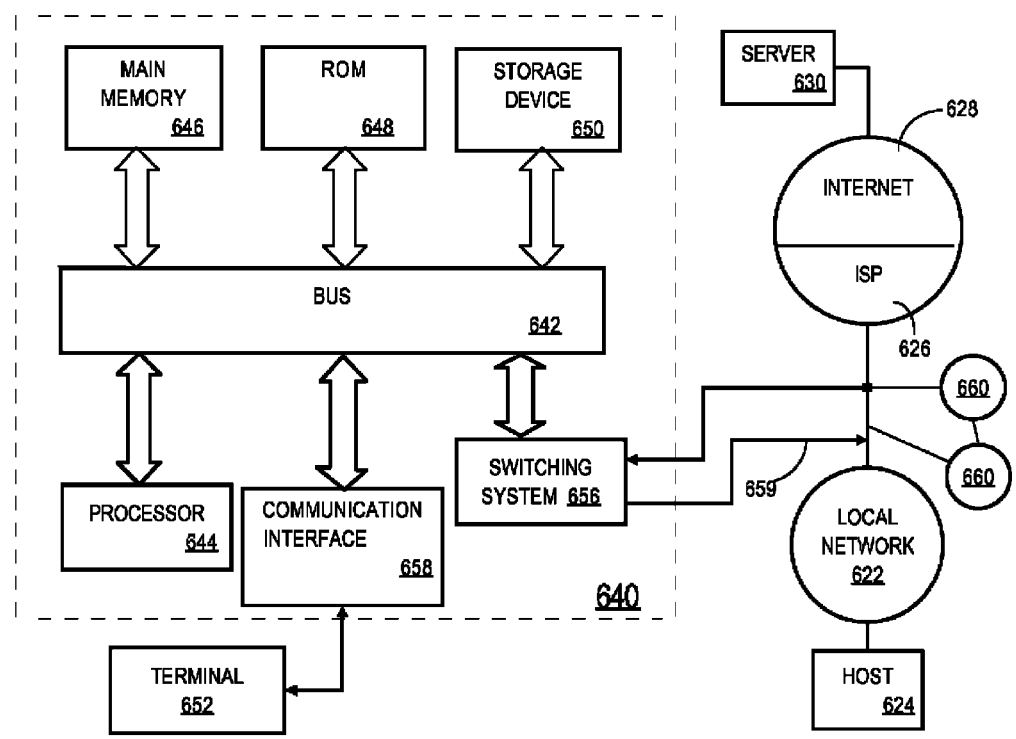
FIG. 6 is a block diagram that illustrates a computer system upon which an embodiment may be implemented.

FIG. 6 is a block diagram that illustrates a computer system 640 upon which the method may be implemented. The method is implemented using one or more computer programs running on a network element such as a router device. Thus, in this embodiment, the computer system 640 is a wireless access point, router, switch, gateway, etc.

Computer system 640 includes a bus 642 or other communication mechanism for communicating information, and a processor 644 coupled with bus 642 for processing information. Computer system 640 also includes a main memory 646, such as a random access memory (RAM), flash memory, or other dynamic storage device, coupled to bus 642 for storing information and instructions to be executed by processor 644. Main memory 646 also may be used for storing temporary variables or other intermediate information during execution of instructions to be executed by processor 644. Computer system 640 further includes a read only memory (ROM) 648 or other static storage device coupled to bus 642 for storing static information and instructions for processor 644. A storage device 650, such as a magnetic disk, flash memory or optical disk, is provided and coupled to bus 642 for storing information and instructions.

A communication interface 658 may be coupled to bus 642 for communicating information and command selections to processor 644. Interface 658 is a conventional serial interface such as an RS-232 or RS-422 interface. An external terminal 652 or other computer system connects to the computer system 640 and provides commands to it using the interface 658. Firmware or software running in the computer system 640 provides a terminal interface or character-based command interface so that external commands can be given to the computer system.

A switching system 656 is coupled to bus 642 and has an input interface and a respective output interface (commonly designated 659) to external network elements. The external network elements may include a plurality of additional routers 660 or a local network 622 coupled to one or more hosts 624 or routers 660, or a global network such as the Internet 628 having one or more servers 630. The switching system 656 switches information traffic arriving on the input interface to output interface 659 according to pre-determined protocols and conventions that are well known. For example, switching system 656, in cooperation with processor 644, can determine a destination of a packet of data arriving on the input interface and send it to the correct destination using the output interface. The destinations may include a host 624, server 630, other end stations, or other routing and switching devices in a local network or Internet 628.

The computer system 640 implements as a router acting as a node the above described method generating routing information. The implementation is provided by computer system 640 in response to processor 644 executing one or more sequences of one or more instructions contained in main memory 646. Such instructions may be read into main memory 646 from another computer-readable medium, such as storage device 650. Execution of the sequences of instructions contained in main memory 646 causes processor 644 to perform the process steps described herein. One or more processors in a multi-processing arrangement may also be employed to execute the sequences of instructions contained in main memory 646. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 644 for execution. Such a medium may take many forms, including but not limited to, non-volatile media and volatile media. Non-volatile media includes, for example, optical or magnetic disks, such as storage device 650. Volatile media includes dynamic memory, such as main memory 646.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge.

Various forms of computer readable media may be involved in carrying one or more sequences of one or more instructions to processor 644 for execution. For example, the instructions may initially be carried on a magnetic disk of a remote computer. The remote computer can load the instructions into its dynamic memory. A modem local to computer system 640 can receive the data on the telephone line and use an infrared transmitter to convert the data to an infrared signal. An infrared detector coupled to bus 642 can receive the data carried in the infrared signal and place the data on bus 642. Bus 642 carries the data to main memory 646, from which processor 644 retrieves and executes the instructions. The instructions received by main memory 646 may optionally be stored on storage device 650 either before or after execution by processor 644.

Interface 659 also provides a two-way data communication coupling to a network link that is connected to a local network. For example, the interface 659 may be an integrated services digital network (ISDN) card or a modem to provide a data communication connection to a corresponding type of telephone line. As another example, the interface 659 may be a local area network (LAN) card to provide a data communication connection to a compatible LAN 622. Wireless links may also be implemented. In any such implementation, the interface 659 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP) 626. The ISP 626 in turn provides data communication services through the world wide packet data communication network now commonly referred to as the "Internet" 628. The local network 622 and the Internet 628 both use electrical, electromagnetic or optical signals that carry digital data streams. The signals through the various networks and the signals on the network link and through the interface 659, which carry the digital data to and from computer system 640, are exemplary forms of carrier waves transporting the information.

Computer system 640 can send messages and receive data, including program code, through the network(s), network link and interface 659. In the Internet example, a server might transmit a requested code for an application program through the Internet, ISP, local network and communication interface 658. One such downloaded application provides for the method as described herein.

The received code may be executed by processor 644 as it is received, and/or stored in storage device 650, or other non-volatile storage for later execution. In this manner, computer system 640 may obtain application code.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of controlling access to a computer network, the method comprising the steps of:
   an access server performing all of:
   receiving a request for network access from an end station device;
   receiving a unique identifier of the end station device;
   determining that the unique identifier is not within a set of authorized identifiers and generating an electronic document that prompts the end station device to enter an authorization code;
   assigning a short-term, non-routable network address to the end station device;
   receiving one or more commands for re-configuring the access server to cause the access server to recognize the authorization code;
   sending the electronic document to the end station device using the short-term, non-routable network address;
   receiving the authorization code from the end station device, wherein the authorization code has been previously generated at a point of sale terminal of a merchant that manages the computer network and issued in response to a customer purchasing goods or services from said merchant associated with the computer network;
   wherein the customer is associated with the end station device and is an individual who personally consumes the purchased goods or services, and the purchased services are services other than access to the computer network;
   attempting to validate the authorization code;
   upon validating the authorization code, assigning a longer-term, routable network address to the end station device.

2. A method as recited in claim 1, further comprising the steps of:
   determining that a network access time limit associated with the longer-term network address has expired;
   removing the unique identifier from the set of authorized identifiers; and
   assigning another short-term, non-routable network address to the end station device.

3. A method as recited in claim 1, further comprising the step of generating and sending to the end station device an electronic document that prompts the end station device to enter the authorization code, wherein the generating and sending step is performed in association with determining that the unique identifier is not within the set of authorized identifiers.

4. A method according to claim 1, wherein the unique identifier is a Media Access Control (MAC) address of the end station device.

5. A method according to claim 1, wherein each of the network addresses is assigned using Dynamic Host Control Protocol (DHCP) by granting a lease of an IP address to the end station device.

6. A method according to claim 5, wherein assigning a short-term, non-routable network address to the end station device comprises assigning a short-term DHCP lease to the end station device.

7. A method according to claim 5, wherein assigning a longer-term, routable network address to the end station device comprises assigning a longer-term DHCP lease to the end station device.

8. A method according to claim 1, further comprising the step of receiving and processing re-configuration information for ending recognition of the authorization code.

9. A method according to claim 1, further comprising the steps of:
receiving and processing re-configuration information for recognizing the authorization code;
determining that a term value associated with the longer-term, routable network address is expired; and
generating second re-configuration information for ending recognition of the authorization code.

10. A method of controlling access to a computer network, the method comprising the steps of:
an access server performing all of:
receiving a DHCP request for a dynamic IP address from an end station device;
receiving a unique identifier of the end station device;
determining that the unique identifier is not within a set of authorized identifiers;
assigning a short-term DHCP lease for a non-routable network address to the end station device;
generating an electronic document that prompts the end station device to enter an authorization code;
assigning a short-term, non-routable network address to the end station device;
receiving one or more commands for re-configuring the access server to cause the access server to recognize the authorization code;
sending the electronic document to the end station device using the short-term, non-routable network address;
receiving a login request from the end station device, wherein the login request includes the authorization code, wherein the authorization code has been previously generated at a point of sale terminal of a merchant that manages the computer network and issued in response to a customer purchasing goods or services from said merchant associated with the computer network;
wherein the customer is associated with the end station device and is an individual who personally consumes the purchased goods or services, and the purchased services are services other than access to the computer network;
determining whether the authorization code is valid as a login identifier;
upon validating the authorization code as a login identifier, assigning a longer-term DHCP lease for a routable network address to the end station device.

11. A method as recited in claim 10, further comprising the steps of:
determining that the longer-term lease has expired;
removing the unique identifier from the set of authorized identifiers; and
assigning another short-term lease for another non-routable network address to the end station device.

12. A method as recited in claim 10, further comprising the step of generating and sending to the end station device an electronic document that prompts the end station device to enter login information, wherein the generating and sending step is performed in association with determining that the unique identifier is not within the set of authorized identifiers.

13. A method according to claim 10, wherein the unique identifier is a Media Access Control (MAC) address of the end station device.

14. A method according to claim 10, further comprising the step of receiving and processing configuration information for removing the authorization code as login information.

15. A method according to claim 10, further comprising the steps of:
receiving and processing re-configuration information for recognizing the authorization code as valid login information;
determining that a term value associated with the longer-term lease is expired; and
generating second re-configuration information for ending recognition of the authorization code.

16. A computer readable volatile or non-volatile storage medium storing one or more sequences of instructions for controlling access to a computer network, which instructions, when executed by one or more processors, cause the one or more processors to perform:
receiving a request for network access from an end station device;
receiving a unique identifier of the end station device;
determining that the unique identifier is not within a set of authorized identifiers;
assigning a short-term, non-routable network address to the end station device;
determining that the unique identifier is not within a set of authorized identifiers and generating an electronic document that prompts the end station device to enter an authorization code;
assigning a short-term, non-routable network address to the end station device;
receiving one or more commands for re-configuring the access server to cause the access server to recognize the authorization code;
sending the electronic document to the end station device using the short-term, non-routable network address;
receiving the authorization code from the end station device, wherein the authorization code has been previously generated at a point of sale terminal of a merchant that manages the computer network and issued in response to a customer purchasing goods or services from said merchant associated with the computer network;
wherein the customer is associated with the end station device and is an individual who personally consumes the purchased goods or services, and the purchased services are services other than access to the computer network;
attempting to validate the authorization code;
upon validating the authorization code, assigning a longer-term, routable network address to the end station device.

17. The computer readable volatile or non-volatile storage medium of claim 16, further comprising instructions which, when executed by the one or more processors, cause the one or more processors to perform:
determining that a network access time limit associated with the longer-term network address has expired;
removing the unique identifier from the set of authorized identifiers; and
assigning another short-term, non-routable network address to the end station device.

18. The computer readable volatile or non-volatile storage medium of claim 16, wherein each of the network addresses is assigned using Dynamic Host Control Protocol (DHCP) by granting a lease of an IP address to the end station device.

19. The computer readable volatile or non-volatile storage medium of claim 18, wherein assigning a short-term, non-routable network address to the end station device comprises assigning a short-term DHCP lease to the end station device.

20. The computer readable volatile or non-volatile storage medium of claim 18, wherein assigning a longer-term, routable network address to the end station device comprises assigning a longer-term DHCP lease to the end station device.

21. The computer readable volatile or non-volatile storage medium of claim 16, further comprising instructions which, when executed by the one or more processors, cause the one or more processors to perform receiving and processing re-configuration information for ending recognition of the authorization code.

22. The computer readable volatile or non-volatile storage medium of claim 16, further comprising instructions which, when executed by the one or more processors, cause the one or more processors to perform:
   receiving and processing re-configuration information for recognizing the authorization code;
   determining that a term value associated with the longer-term, routable network address is expired; and
   generating second re-configuration information for ending recognition of the authorization code.

23. A wireless access point for selectively enabling wireless end station devices to access a network, the wireless access point comprising:
   a DHCP server;
   a memory comprising a stored set of zero or more authorized unique identifiers of end station devices that are authorized to access the network;
   one or more sequences of instructions for controlling network access which, when executed by one or more processors in the wireless access point, cause the processors to perform the steps of:
   receiving a request for network access from an end station device;
   receiving a unique identifier of the end station device;
   determining that the unique identifier is not within the set of authorized identifiers;
   assigning a short-term DHCP lease for a non-routable network address to the end station device;
   generating an electronic document that prompts the end station device to enter an authorization code;
   assigning a short-term, non-routable network address to the end station device;
   receiving one or more commands for re-configuring the wireless access point to cause the wireless access point to recognize the authorization code;
   sending the electronic document to the end station device using the short-term, non-routable network address;
   receiving the authorization code from the end station device, wherein the authorization code has been previously generated at a point of sale terminal of a merchant that manages the computer network and issued in response to a customer purchasing goods or services from said merchant associated with the computer network;
   wherein the customer is associated with the end station device and is an individual who personally consumes the purchased goods or services, and the purchased services are services other than access to the computer network;
   attempting to validate the authorization code;
   upon validating the authorization code as a login identifier, assigning a longer-term DHCP lease for a routable network address to the end station device.

24. The wireless access point of claim 23, said one or more sequences of instructions further comprising instructions which, when executed by the one or more processors in the wireless access point, cause the processors to perform:
   determining that a network access time limit associated with the longer-term network address has expired;
   removing the unique identifier from the set of authorized identifiers; and
   assigning another short-term, non-routable network address to the end station device.

25. The wireless access point of claim 23, wherein each of the network addresses is assigned using Dynamic Host Control Protocol (DHCP) by granting a lease of an IP address to the end station device.

26. The wireless access point of claim 25, wherein assigning a short-term, non-routable network address to the end station device comprises assigning a short-term DHCP lease to the end station device.

* * * * *